United States Patent
Yen

(10) Patent No.: US 9,538,386 B2
(45) Date of Patent: *Jan. 3, 2017

(54) WIRELESS INTERNET ACCESS WITH ENHANCED BANDWIDTH CAPABILITIES

(71) Applicant: Robert C. Yen, Milpitas, CA (US)

(72) Inventor: Robert C. Yen, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,818

(22) Filed: Oct. 1, 2012

(65) Prior Publication Data

US 2014/0092818 A1  Apr. 3, 2014
US 2016/0183096 A9  Jun. 23, 2016

Related U.S. Application Data

(60) Continuation of application No. 11/775,092, filed on Jul. 9, 2007, now Pat. No. 8,307,113, which is a division of application No. 09/967,532, filed on Sep. 27, 2001, now Pat. No. 7,245,634, which is a continuation-in-part of application No. 09/578,816, filed on May 24, 2000, now Pat. No. 8,516,146.

(60) Provisional application No. 60/236,016, filed on Sep. 27, 2000, provisional application No. 60/266,924, filed on Feb. 6, 2001, provisional application No. 60/167,516, filed on Nov. 24, 1999, provisional application No. 60/188,982, filed on Mar. 13, 2000.

(51) Int. Cl.
H04W 28/16 (2009.01)
H04W 16/06 (2009.01)
H04W 72/04 (2009.01)

(52) U.S. Cl.
CPC ............. *H04W 16/06* (2013.01); *H04W 28/16* (2013.01); *H04W 72/0426* (2013.01); *H04W 72/0486* (2013.01)

(58) Field of Classification Search
USPC ........ 370/228, 229, 338, 351–356, 238, 331
See application file for complete search history.

(56) References Cited

U.S. PATENT DOCUMENTS

| | | |
|---|---|---|
| 5,208,804 A | 5/1993 | Wilson et al. |
| 5,521,591 A | 5/1996 | Arora et al. |
| 5,564,120 A | 10/1996 | Orimo et al. |
| 5,652,908 A | 7/1997 | Douglas et al. |
| 5,701,451 A | 12/1997 | Rogers et al. |

(Continued)

FOREIGN PATENT DOCUMENTS

| | | |
|---|---|---|
| WO | WO 01/11488 A2 | 2/2001 |
| WO | WO 01/11502 A2 | 2/2001 |
| WO | WO 01/11503 A2 | 2/2001 |

OTHER PUBLICATIONS

Akamai Technologies, Inc., webpages on Akamai Streaming Overview and Freeflow, http://www.akamai.com, downloaded Feb. 20, 2000.

(Continued)

*Primary Examiner* — Jenee Williams

(57) ABSTRACT

Techniques for efficiently and economically providing data transfer through wireless data networks. These techniques are particularly suitable for Internet data transfers. In one aspect, mobile devices are able to be allocated additional wireless channels to obtain increased data transfer capabilities. The additional wireless channels can be used for unicast, multicast or broadcast of data. These techniques provide additional wireless bandwidth to mobile devices and allows control over allocation of the additional wireless bandwidth.

20 Claims, 8 Drawing Sheets

(56) References Cited

U.S. PATENT DOCUMENTS

| | | | |
|---|---|---|---|
| 5,701,580 | A | 12/1997 | Yamane et al. |
| 5,764,235 | A | 6/1998 | Hunt et al. |
| 5,808,607 | A | 9/1998 | Brady et al. |
| 5,809,242 | A | 9/1998 | Shaw et al. |
| 5,859,840 | A | 1/1999 | Tiedemann, Jr. et al. |
| 6,589,840 | B2 | 1/1999 | Tiedemann, Jr. et al. |
| 5,870,562 | A | 2/1999 | Butman et al. |
| 5,878,416 | A | 3/1999 | Harris et al. |
| 5,896,502 | A | 4/1999 | Shieh et al. |
| 5,933,600 | A | 8/1999 | Shieh et al. |
| 5,944,780 | A | 8/1999 | Chase et al. |
| 5,956,716 | A | 9/1999 | Kenner et al. |
| 5,961,602 | A | 10/1999 | Thompson et al. |
| 5,983,030 | A | 11/1999 | Nagano |
| 5,983,090 | A * | 11/1999 | Aoki ............................ 370/329 |
| 5,987,480 | A | 11/1999 | Donohue et al. |
| 5,991,809 | A | 11/1999 | Kriegsman |
| 5,996,007 | A | 11/1999 | Klug et al. |
| 6,003,030 | A | 12/1999 | Kenner et al. |
| 6,006,264 | A | 12/1999 | Colby et al. |
| 6,014,698 | A | 1/2000 | Griffiths |
| 6,014,707 | A | 1/2000 | Miller et al. |
| 6,088,578 | A | 7/2000 | Manning et al. |
| 6,097,733 | A | 8/2000 | Basu et al. |
| 6,108,703 | A | 8/2000 | Leighton et al. |
| 6,112,239 | A | 8/2000 | Kenner et al. |
| 6,115,378 | A | 9/2000 | Hendel et al. |
| 6,185,598 | B1 | 2/2001 | Farber et al. |
| 6,259,915 | B1 | 7/2001 | Raith |
| 6,298,234 | B1 * | 10/2001 | Brunner ........................ 370/400 |
| 6,310,941 | B1 * | 10/2001 | Crutcher et al. ............. 370/352 |
| 6,330,244 | B1 * | 12/2001 | Swartz et al. ................ 370/329 |
| 6,330,671 | B1 | 12/2001 | Azoz |
| 6,363,410 | B1 | 3/2002 | Kanamori et al. |
| 6,370,688 | B1 | 4/2002 | Hejna, Jr. |
| 6,418,148 | B1 | 7/2002 | Kumar et al. |
| 6,466,933 | B1 | 10/2002 | Huang et al. |
| 6,477,565 | B1 | 11/2002 | Daswani et al. |
| 6,483,820 | B1 | 11/2002 | Davidson et al. |
| 6,643,820 | B2 | 11/2002 | Davidson et al. |
| 6,519,252 | B2 * | 2/2003 | Sallberg ........................ 370/356 |
| 6,526,580 | B2 | 2/2003 | Shimomura et al. |
| 6,535,742 | B1 | 3/2003 | Jiang et al. |
| 6,608,832 | B2 * | 8/2003 | Forslow ........................ 370/353 |
| 6,658,269 | B1 | 12/2003 | Golemon et al. |
| 6,665,704 | B1 | 12/2003 | Singh |
| 6,721,294 | B1 | 4/2004 | Bahrenburg et al. |
| 6,742,016 | B1 | 5/2004 | Bhoj |
| 6,795,411 | B1 | 9/2004 | Dino et al. |
| 6,856,804 | B1 | 2/2005 | Ciotta |
| 6,968,394 | B1 | 11/2005 | El-Rafie |
| 7,003,558 | B2 | 2/2006 | Agrusa et al. |
| 7,239,632 | B2 * | 7/2007 | Kalavade et al. ............. 370/389 |
| 7,245,634 | B2 * | 7/2007 | Yen ................................ 370/468 |
| 7,523,173 | B2 | 4/2009 | Seki et al. |
| 8,307,113 | B2 | 11/2012 | Yen |
| 8,516,146 | B1 | 8/2013 | Yen |
| 8,972,527 | B2 | 3/2015 | Yen |
| 2001/0001268 | A1 * | 5/2001 | Menon et al. ................. 370/329 |
| 2001/0006517 | A1 * | 7/2001 | Lin et al. ...................... 370/348 |
| 2001/0022784 | A1 * | 9/2001 | Menon et al. ................. 370/329 |
| 2001/0032236 | A1 * | 10/2001 | Lin ................................ 709/203 |
| 2001/0043588 | A1 * | 11/2001 | Sallberg ........................ 370/352 |
| 2001/0048686 | A1 * | 12/2001 | Takeda et al. ................. 370/338 |
| 2001/0052003 | A1 | 12/2001 | Seki et al. |
| 2001/0055286 | A1 * | 12/2001 | Lin et al. ...................... 370/329 |
| 2002/0001337 | A1 * | 1/2002 | Chauncey et al. ............. 375/132 |
| 2002/0010753 | A1 | 1/2002 | Matsuoka et al. |
| 2002/0037004 | A1 * | 3/2002 | Bossemeyer et al. ........ 370/328 |
| 2002/0045459 | A1 * | 4/2002 | Morikawa .................... 455/517 |
| 2002/0048268 | A1 * | 4/2002 | Menon et al. ................. 370/349 |
| 2002/0073155 | A1 | 6/2002 | Anupam et al. |
| 2002/0078235 | A1 * | 6/2002 | Yen .......................... H04L 29/06 709/238 |
| 2002/0123330 | A1 * | 9/2002 | Yen .......................... H04W 64/00 455/414.1 |
| 2002/0191575 | A1 * | 12/2002 | Kalavade et al. ............. 370/338 |
| 2004/0018854 | A1 * | 1/2004 | Gorsuch ....................... 455/553.1 |
| 2004/0097260 | A1 * | 5/2004 | Stenton et al. ............... 455/552.1 |
| 2005/0053119 | A1 * | 3/2005 | Day ............................... 375/130 |
| 2005/0135299 | A1 * | 6/2005 | Bishop et al. ................. 370/328 |
| 2005/0220048 | A1 * | 10/2005 | Lee et al. ...................... 370/328 |
| 2006/0128302 | A1 * | 6/2006 | van Rooyen et al. ........ 455/3.06 |

OTHER PUBLICATIONS

Cnet features-techno-20 questions: How the Net works, "How does the Net work?" http://coverage.cnet.com/Content/Features/Techno/Networks/ss02.html, downloaded Feb. 19, 2000.

Cnet features-techno-20 questions: How the New works, "What is the Internet?" http://coverage.cnet.com/Content/Features/Techno/Networks/sso1.html.downloaded Feb. 19, 2000.

"iShopper Inc. Acquires Uniq Studios Inc", Company Press Release, May 16, 2000, http://biz.yahoo.com/bw/000516/ut_ishoppe.html, downloaded Jul. 9, 2000.

U.S. Appl. No. 09/578,816, filed May 24, 2000.

Office Action for U.S. Appl. No. 09/578,816 dated May 22, 2003.

Final Office Action for U.S. Appl. No. 09/578,816 dated Dec. 18, 2003.

Office Action for U.S. Appl. No. 09/578,816 dated Jun. 7, 2007.

Restriction Requirement for U.S. Appl. No. 09/578,816 dated Mar. 5, 2007.

Final Office Action for U.S. Appl. No. 09/578,816 dated Dec. 12, 2007.

Advisory Action for U.S. Appl. No. 09/578,816 dated Mar. 5, 2008.

Final Office Action for U.S. Appl. No. 09/578,816 dated Aug. 26, 2008.

Notice of Appeal for U.S. Appl. No. 09/578,816, filed Jan. 14, 2010.

Advisory Action for U.S. Appl. No. 09/578,816 dated Mar. 2, 2010.

Examiner's Answer to Appeal Brief for U.S. Appl. No. 09/578,816 dated Dec. 15, 2010.

Appeal Docketing Notice for U.S. Appl. No. 09/578,816, filed May 12, 2011.

U.S. Appl. No. 09/967,532, filed Sep. 27, 2001.

Restriction Requirement for U.S. Appl. No. 09/667,532 dated Jan. 13, 2005.

Office Action for U.S. Appl. No. 09/667,532 dated May 3, 2005.

Office Action for U.S. Appl. No. 09/667,532 dated Nov. 14, 2005.

Final Office Action for U.S. Appl. No. 09/667,532 dated May 17, 2006.

Advisory Action for U.S. Appl. No. 09/667,532 dated Jul. 14, 2006.

Advisory Action for U.S. Appl. No. 09/667,532 dated Aug. 25, 2006.

Office Action for U.S. Appl. No. 09/667,532 dated Nov. 16, 2006.

Notice of Allowance for U.S. Appl. No. 09/667,532 dated Mar. 23, 2007.

Issue Notification for U.S. Appl. No. 09/667,532 dated Jun. 27, 2007.

U.S. Appl. No. 11/775,092, filed Jul. 9, 2007.

Office Action for U.S. Appl. No. 11/775,092 dated Mar. 2, 2010.

Final Office Action for U.S. Appl. No. 11/775,092 dated Aug. 20, 2010.

Advisory Action for U.S. Appl. No. 11/775,092 dated Jan. 31, 2011.

Notice of Appeal for U.S. Appl. No. 11/775,092 dated Feb. 22, 2001.

Office Action for U.S. Appl. No. 11/775,092 dated Oct. 7, 2011.

Notice of Allowance for U.S. Appl. No. 11/775,092 dated May 16, 2012.

Notice of Allowance for U.S. Appl. No. 11/775,092 dated Jul. 20, 2012.

Issue Notification for U.S. Appl. No. 11/775,092 dated Oct. 17, 2012.

Decision on Appeal for U.S. Appl. No. 09/578,816 dated Dec. 15, 2010.

Advisory Action for U.S. Appl. No. 09/578,816 dated Jun. 24, 2004.

Final Office Action for U.S. Appl. No. 09/578,816 dated Oct. 14, 2009.

(56) References Cited

OTHER PUBLICATIONS

Notice of Allowance for U.S. Appl. No. 09/578,816 dated Mar. 28, 2013.
International Search Report for International Patent Application No. PCT/US01/30469, mailed Oct. 10, 2002.
Office Action for U.S. Appl. No. 13/632,818, mailed Feb. 28, 2014.
Office Action for U.S. Appl. No. 13/961,076, mailed Jun. 24, 2014.
Notice of Allowance for U.S. Appl. No. 13/961,076, mailed Oct. 24, 2014.
Final Office Action for U.S. Appl. No. 13/632,818, mailed Dec. 4, 2015.

* cited by examiner

WIRELESS INTERNET ACCESS WITH ENHANCED BANDWIDTH CAPABILITIES

CROSS-REFERENCE TO RELATED APPLICATIONS

This application is a continuation of U.S. patent application Ser. No. 11/775,092, filed Jul. 9, 2007, and entitled "WIRELESS INTERNET ACCESS WITH ENHANCED BANDWIDTH CAPABILITIES", and which is hereby incorporated by reference herein, which in turn is (a) a divisional application of U.S. patent application Ser. No. 09/967,532, filed Sep. 27, 2001, and entitled "WIRELESS INTERNET ACCESS WITH ENHANCED BANDWIDTH CAPABILITIES", and which is hereby incorporated by reference herein, which in turn claims the benefit of: (i) U.S. Provisional Patent Application No. 60/236,016, filed Sep. 27, 2000, and entitled "WIRELESS INTERNET USING CELL BASED CHANNELS FOR ADDITIONAL CAPACITY AND MULTICAST DATA TRANSMISSION WITH VARIABLE DELAYED RESPONSE", which is hereby incorporated by reference herein; and (ii) U.S. Provisional Patent Application No. 60/266,924, filed Feb. 6, 2001, and entitled "METHODS, SYSTEM AND APPARATUS FOR MOBILE INTERNET NETWORK", and which is hereby incorporated by reference herein; and (b) a continuation-in-part of U.S. patent application Ser. No. 09/578,816, filed May 24, 2000, and entitled "METHOD AND SYSTEM FOR REDUCTION OF DELAY AND BANDWIDTH REQUIREMENTS IN INTERNET DATA TRANSFER", and which is hereby incorporated by reference herein, which in turn claims the benefit of: (i) U.S. Provisional Patent Application No. 60/167,516, filed Nov. 24, 1999, and entitled "REDUCTION OF DELAY AND BANDWIDTH REQUIREMENTS IN INTERNET DATA TRANSFER", which is hereby incorporated by reference herein; and (ii) U.S. Provisional Patent Application No. 60/188,982, filed Mar. 13, 2000, and entitled "REDUCTION OF DELAY AND BANDWIDTH REQUIREMENTS IN INTERNET DATA TRANSFER", and which is hereby incorporated by reference herein.

This application is also related to U.S. patent application Ser. No. 09/721,907, filed Nov. 24, 2000, and entitled "METHOD AND SYSTEM FOR PROVIDING LOCAL CONTENT FOR USE IN PARTIALLY SATISFYING INTERNET DATA REQUESTS FROM REMOTE SERVERS", now U.S. Pat. No. 6,904,455, and which is hereby incorporated by reference herein.

BACKGROUND OF THE INVENTION

Field of the Invention

The present invention relates to wireless networks and, more particularly, to data transmission over wireless networks.

Description of the Related Art

The Internet or the World Wide Web is a global network of interconnected computers. Clients or users can access files or documents, e.g., hypermedia documents, residing on the host website computers connected to the Internet through use of a network browser program. Examples of network browser programs include Netscape Navigator or Microsoft Explorer. One type of hypermedia documents is commonly referred to as web pages. Sites or documents on the Internet are typically chosen by a user by entering a site address, i.e., a Universal Resource Locator (URL), or by a selection of a link on a displayed web page.

FIG. 8 is a conventional client/server system 800. The conventional client/server system 800 includes a client system 802 that couples to a server system 804 via the Internet 806. In this manner, any of a plurality of local files 808 (documents) associated with the server system 804 can be delivered to the client system 802 through the Internet 806. For example, the server system 804 transfers data for files 808 to the client system 802 through the Internet 806 utilizing a standard protocol, e.g., Hyper Text Transfer Protocol (HTTP), for transferring data through the Internet 806. The server system 804 represents a host website computer providing the local files 808.

Unfortunately, due to the increased popularity of the use of the Internet 806 and due to increases in file sizes that are to be delivered to the client system 802 through the Internet 806, increasing demands are placed on the server system 804 and links 810 and 812 to handle the increased traffic. The file sizes continue to increase as files (e.g., web pages) become more elaborate and more graphical. As a result, general congestion tends to form in the system 800. This general congestion (or traffic) leads to slowed data transfer through the Internet 806, and thus clients or users face long waiting times.

In the case where the client system 802 connects to the Internet 806 through a wireless network and a wireless Internet Service Provider (ISP), the data transfer is presented with additional difficulties. Namely, the wireless connection has limited bandwidth which leads to even slower data transfer. The slow data transfer is not only frustrating to users but also expensive as users typically have to pay for wireless Internet access on a connection time basis.

Conventional solutions to difficulties problems with providing wireless Internet access have primarily been directed at reducing the amount of data to be transferred. For example, with Internet access, the data requested is often a web page. Conventionally, web pages have been "stripped down" for wireless access. For example, graphical images have been removed from the web pages. While removing graphical images does substantially reduce the amount of data to be transferred for a web page, it results in an uninteresting web page. The graphical images are important not only to the presentation of the information associated with the web page but also to providing advertising revenue. Another conventional approach has been to build private wireless networks for densely populated user areas, such as a corporate site, university, hotel, etc. These private wireless networks might be able to provide improved Internet access, but these networks are expensive to build and are only usable while in limited areas (e.g., corporate site, university, hotel).

Therefore, there is a need for improved techniques for efficiently and economically providing data transfer through wireless data networks.

SUMMARY

Broadly speaking, the invention relates to techniques for efficiently and economically providing data transfer through wireless data networks. The invention is particularly suitable for Internet data transfers. In one aspect of the invention, mobile devices are able to be allocated additional wireless channels to obtain increased data transfer capabilities. The additional wireless channels can be used for unicast, multicast or broadcast of data. The invention provides additional wireless bandwidth to mobile devices and allows control over allocation of the additional wireless bandwidth.

The invention can be implemented in numerous ways, including as a method, system, apparatus, and computer readable medium. Several embodiments of the invention are discussed below.

As a method for sending data to wireless device over a wireless network, one embodiment of the invention includes at least the acts of: receiving a plurality of requests for a particular resource provided at a remote server on a wired data network, the plurality of requests being provided by different wireless devices; retrieving the particular resource from the remote server once for the plurality of requests to obtain the particular resource requested by the plurality of requests; and thereafter sending the particular resource to the different wireless devices.

As a system for transmitting data from servers through a wireless data network to wireless clients, one embodiment of the invention includes at least: a wireless Internet Service Provider centers coupled to the wireless data network and a wired data network, the wireless data network utilizing a plurality of base stations located at geographically distinct areas; and a plurality of banks of additional wireless devices, each of the additional wireless devices being capable of providing at least one wireless data channel to said wireless Internet Service Provider via the wireless data network Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to techniques for efficiently and economically providing data transfer through wireless data networks. The invention is particularly suitable for Internet data transfers. In one aspect of the invention, mobile devices are able to be allocated additional wireless channels to obtain increased data transfer capabilities. The additional wireless channels can be used for unicast, multicast or broadcast of data. The invention provides additional wireless bandwidth to mobile devices and allows control over allocation of the additional wireless bandwidth.

Embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
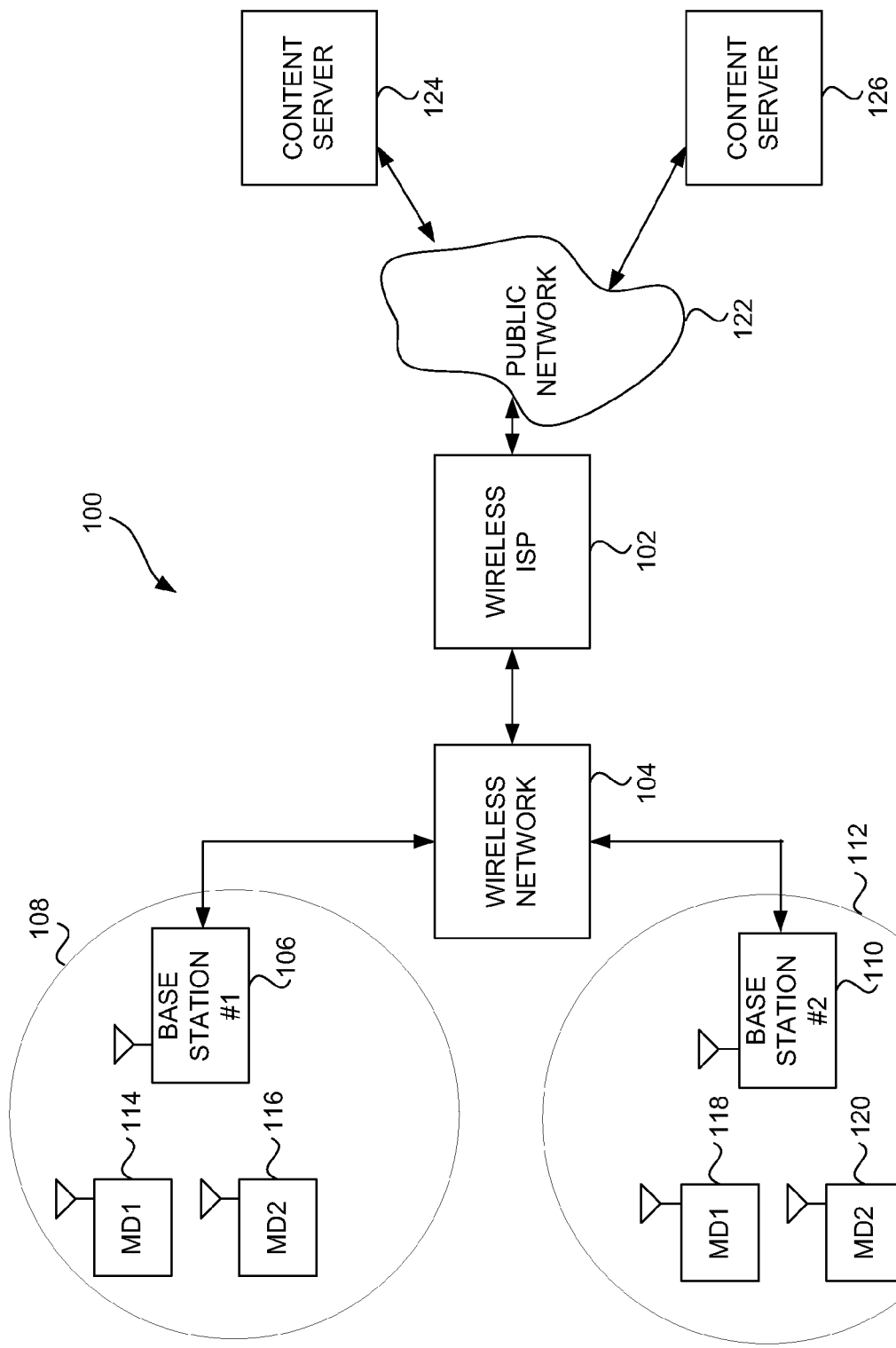
FIG. 1 is a block diagram of a wireless data system according to one embodiment of the invention.

FIG. 1 is a block diagram of a wireless data system 100 according to one embodiment of the invention. The wireless data system 100 includes a wireless Internet Service Provider (ISP) 102. The wireless ISP 102 provides wireless access to remotely located data for users of a wireless network 104. The wireless network 104 typically includes various base stations. As shown in FIG. 1, the wireless network 104 includes a base station #1 106 within a first geographic region 108 and a base station #2 110 in a second geographic region 112. The base station #1 106 communicates with mobile devices 114 and 116 within the first geographic region 108 using radio frequency (RF) transmissions. Likewise, the base station #2 110 communicates with mobile devices 118 and 120 within the second geographic region 112 using radio frequency (RF) transmissions. The wireless network 104 can also provide voice services for those of the mobile devices that are or include mobile phones. Hence, the RF transmissions can be used to transmit data and/or voice between the mobile devices and their associated base station.

In one embodiment, the mobile devices 114-120 are mobile computing devices that include network browsers that can request data that is remotely located and can receive incoming data. The mobile devices 114-120 can also be mobile communication devices such as mobile phones (e.g., cellular phones). The mobile devices 114-120 can also include a display screen upon which incoming data can be displayed. For example, the incoming data can be data files. The data files can pertain to documents, such as markup language documents. In the case of markup language documents, the markup language documents can be displayed on the display screen as web pages. One example of a markup language document is a HTML document.

The wireless data system 100 also includes a public network 122 that couple the wireless ISP 102 to various remote content servers, such as content server 124 and content server 126. The content servers 124 and 126 store remote resources that can be requested by the mobile devices 114-120. As an example, the public network 122 can be the Internet or the World Wide Web (WWW).

The wireless data system 100 operates to permit the mobile devices 114-120 to utilize additional channels beyond their fixed channel in order to transmit or receive data through the wireless network 104. The mobile devices 114-120 thus include hardware support (e.g., programmable transceivers) for additional channels. Conventionally, a mobile device has a single channel (fixed channel) over which the mobile device is able to communicate with a base station to receive and transmit voice and/or data. Here, the mobile devices 114-120 support not only the normal single channel but also one or more additional channels that can be temporarily utilized or assigned to one or more of the mobile devices 114-120. A mobile device is thus able to communicate with a base station using multiple channels. Consequently, data transfer rates between a mobile device and a wireless network are substantially improved.

Figure 2:
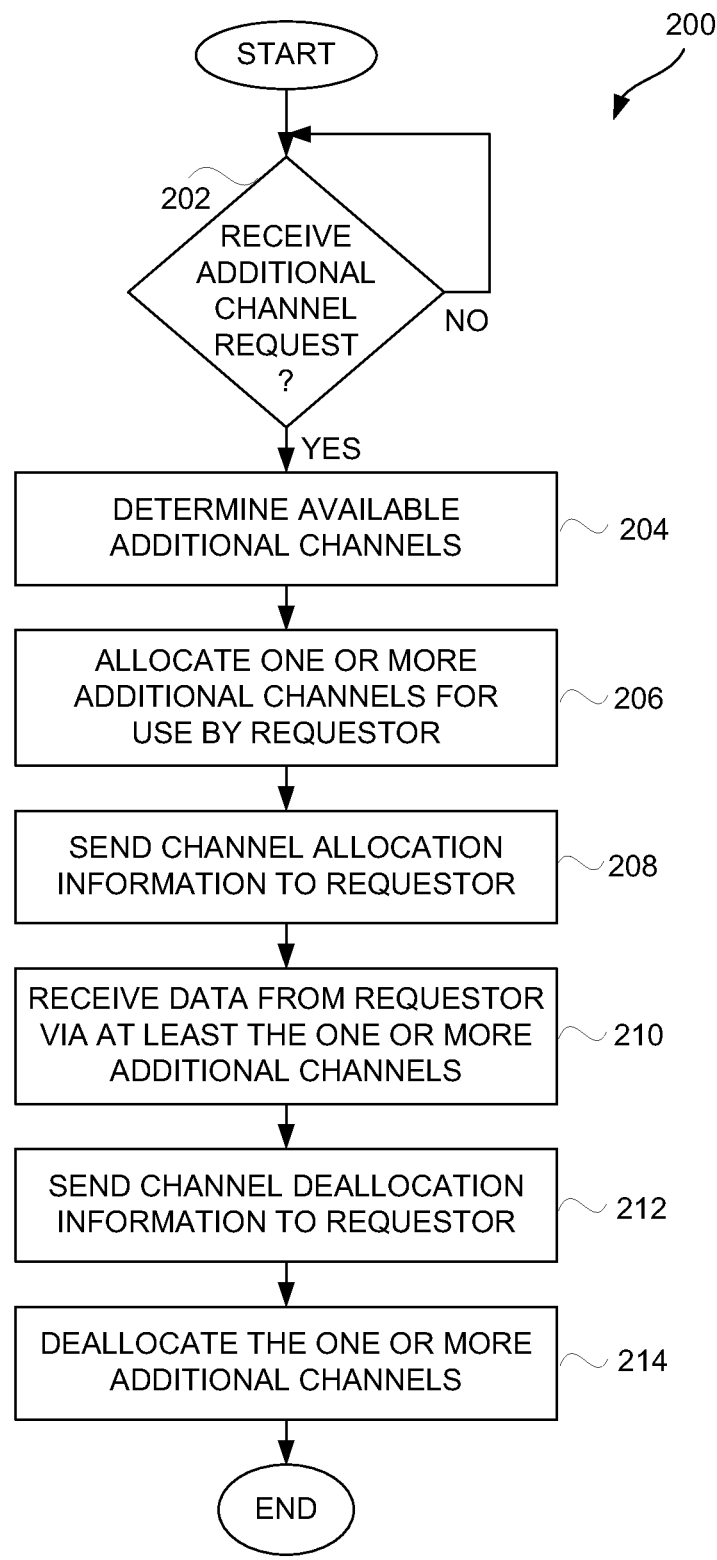
FIG. 2 is a flow diagram of data transmission processing according to one embodiment of the invention.

FIG. 2 is a flow diagram of data transmission processing 200 according to one embodiment of the invention. The data transmission processing 200 can, for example, be performed by a wireless ISP (e.g., the wireless ISP 102) or other suitable component of a wireless data system.

The data transmission processing 200 begins with a decision 202 that determines whether an additional channel request has been received. Here, a mobile device (or some agent on its behalf) can request that an additional channel be assigned so that it is able to transmit data over the wireless network at greater data transfer rates. When the decision 202 determines that an additional channel request has not yet been received, the data transmission processing 200 awaits such a request. In other words, the data transmission processing 200 is effectively invoked when an addition channel request is received.

Once the decision 202 determines that an additional channel request has been received, available additional channels are determined 204. Here, the channel manager typically has a number of channels that are available for use and assignment to handle data transfers between the mobile devices and the wireless network of the wireless data system. The available additional channels are those channels that are available to be assigned for data transmission purposes. Next, one or more additional channels are allocated 206 for use by the requestor. The requestor is the mobile device or its agent that has requested the additional one or more channels. Then, channel allocation information is sent 208 to the requestor. The channel allocation information specifies one or more channel identifiers that uniquely identify the additional one or more channels that have been allocated to the requestor. Upon receiving the channel allocation information, the requestor (i.e., mobile device) can operate to configure its one or more programmable transceivers to utilize the allocated one or more additional channels.

After the channel allocation information has been sent 208, data is received 210 from the requestor via at least the one or more additional channels. Here, data is sent through the wireless network by the requestor using the one or more additional channels that have been allocated. Further, the data can also be sent through the wireless network by the requestor using the primary channel associated with the requestor. Alternatively, the primary channel (fixed channel) can be used as a two-way control channel. After the data has been received 210, channel deallocation information is sent 212 to the requestor. The channel deallocation information informs the requestor that the one or more additional channels that have been previously allocated and utilized are now deallocated and not to be further used. Here, the requestor can then close connections to limit connection time and deactivate hardware components (e.g., the programmed transceivers) that have been utilized to transmit the data over the one or more additional channels. After the channel deallocation information sent 212, the one or more additional channels can be deallocated 214. By deallocating the one or more additional channels, the additional channels become available for subsequent use as available additional channels, such as to satisfy other additional channel requests. Following the operation 214, the data transmission processing 200 is complete and ends.

According to the data transmission processing 200, a mobile device is able to gain temporary use of one or more additional channels over which data can be transmitted from a mobile device to a destination through a wireless network. The destination can be a computing device (e.g., server computer) coupled to the public network (e.g., the Internet) or another mobile device. Hence, the dynamic allocation of one or more additional channels to a mobile device substantially improves the data transmission capability of the mobile device.

Figure 3:
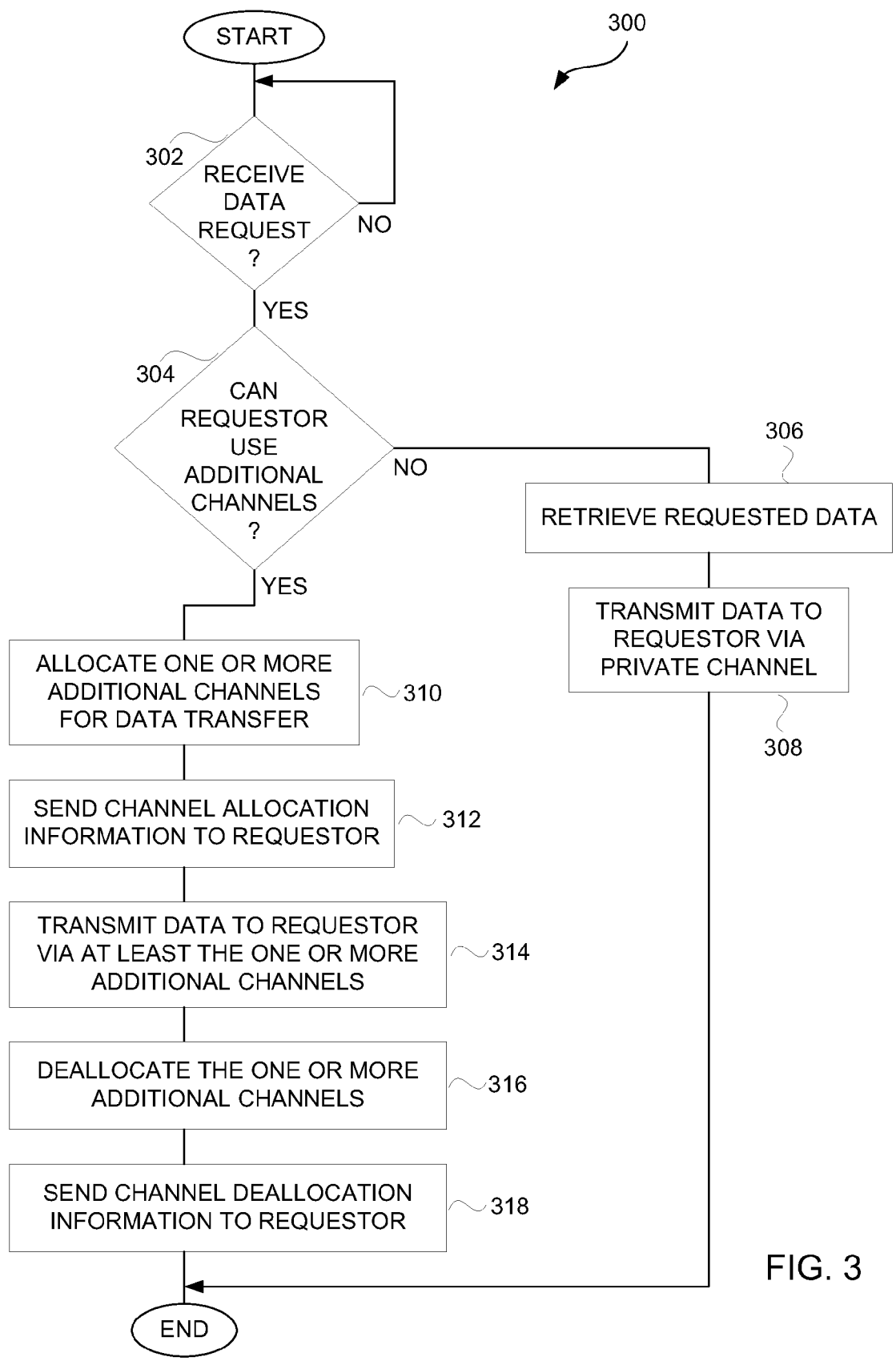
FIG. 3 is a flow diagram of data reception processing according to one embodiment of the invention.

FIG. 3 is a flow diagram of data reception processing 300 according to one embodiment of the invention. The data reception processing 300 can, for example, be performed by a wireless ISP (e.g., the wireless ISP 102) or other suitable component of a wireless data system. The data reception processing 300 is associated with a transfer of data through a wireless network to a mobile device using additional channels to gain increased bandwidth (i.e., faster data rate).

The data reception processing 300 begins with a decision 302 that determines whether a data request has been received from a requestor (i.e., mobile device). When the decision 302 determines that a data request has not yet been received, the data reception processing 300 awaits such a request. Once the decision 302 determines that a data request has been received, a decision 304 determines whether the requestor can use additional channels. Here, the decision 304 can take into consideration a variety of items. For example, the requestor might not be able to use additional channels because the requestor may not be permitted to use additional channels due to limitations of their mobile device or their subscription plan with the wireless network. As another example, the requestor may not desire to use additional channels due to additional charges or fees that may be imposed. On the other hand, the request from the requestor could itself indicate a desire to use additional channels. The request could also indicate its capabilities to handle additional channels. The availability of additional channels for use with the requestor also affects the decision 304.

In any case, when the decision 304 determines that the requestor is not to use additional channels, then the requested data (content) is retrieved 306. The requested data is typically stored on a content server that is accessible to the wireless network or a wired network coupled thereto. Then, the requested data is transmitted 308 to the requestor via the private channel associated with the requestor. The private channel is the main or primary channel that is typically fixed within a mobile device when placed in service.

On the other hand, when the decision 304 determines that the requestor can use additional channels, one or more additional channels are allocated 310 for data transfer. These additional channels operate as wireless data channels through the wireless network. Next, channel allocation information is sent 312 to the requestor. The channel allocation information informs the requestor of the one or more additional channels that are going to be utilized to transfer data to the requestor (i.e., mobile device). Upon receiving the channel allocation information, the requestor (i.e., mobile device) can operate to configure its one or more programmable transceivers to utilize the allocated one or more additional channels.

After the channel allocation information has been sent 312, data can be transmitted 314 to the requestor via at least the one or more additional channels. Typically, the data transmission utilizes not only the one or more additional channels that have allocated for use with the requestor but also the private channel associated with the requestor. Alternatively, the primary channel (fixed channel) can be used as a two-way control channel. After the data has been transmitted to the requestor, the one or more additional channels that were allocated for the data transfer with the requestor can be deallocated 316. By deallocating the previously allocated one or more additional channels, these one or more additional channels become again available for reassignment. Then, the channel deallocation information is sent 318 to the requestor. After receiving the channel deallocation information, the requestor can then close connections to limit connection time and deactivate hardware components (e.g., the programmed transceivers) that have been utilized to receive the data incoming on the one or more additional channels. Following the operation 318, as well as following the operation 308 in the case in which no additional channels are utilized, the data reception processing 300 for the data request is complete and ends.

Figure 4:
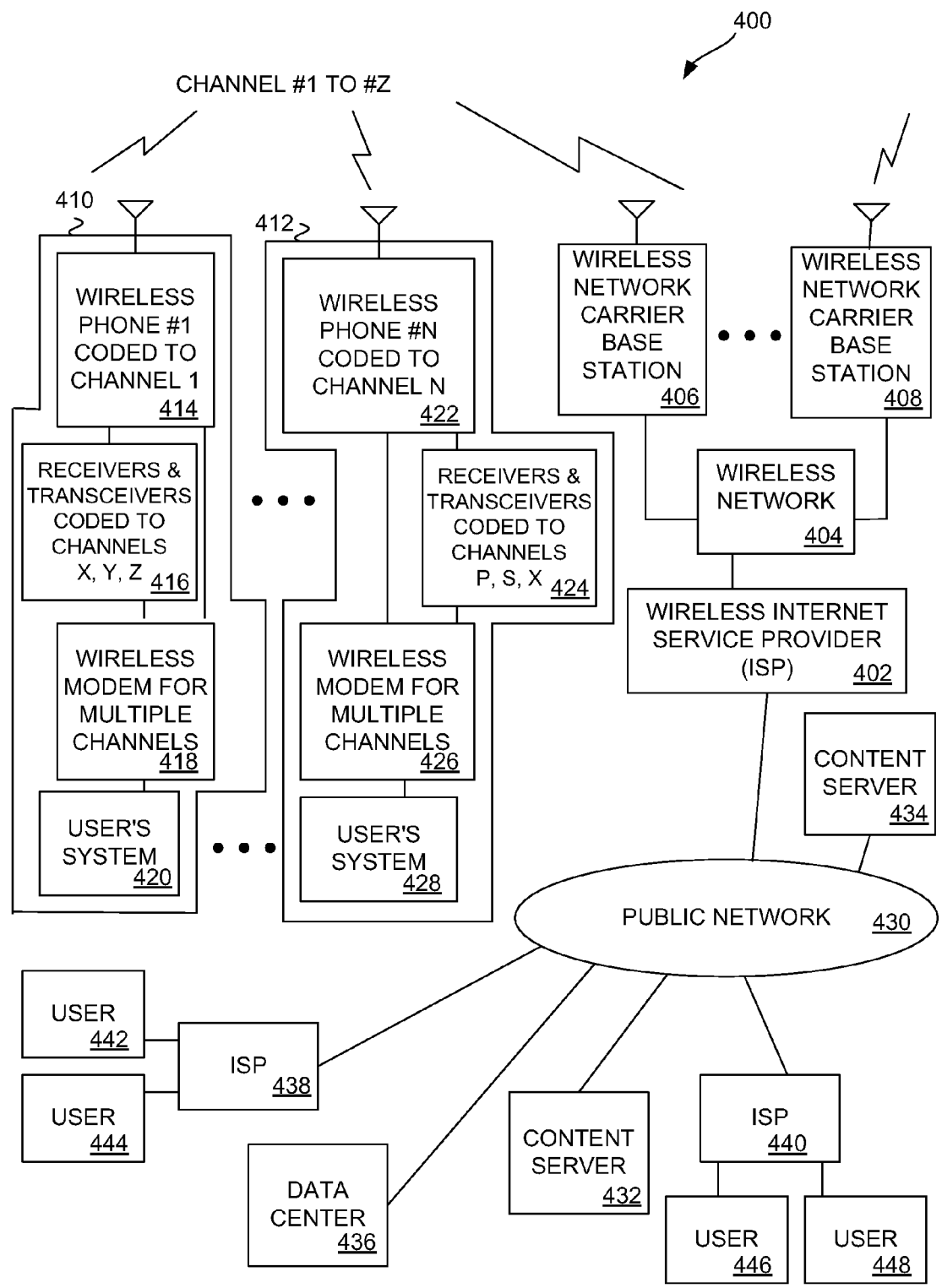
FIG. 4 is a block diagram of a wireless data system according to another embodiment of the invention.

FIG. 4 is a block diagram of a wireless data system 400 according to another embodiment of the invention. The wireless data system 400 includes a wireless ISP 402 that couples to a wireless network 404. The wireless network 404 includes or couples to a plurality of wireless network carrier base stations, including wireless network carrier base stations 406 and 408. The wireless network carrier base stations 406 and 408 transmit and receive radio frequency signals to and from a plurality of wireless devices, including wireless devices 410 and 412. For ease of representation, the wireless data system 400 is illustrated as including two base stations and two wireless devices. However, it should be recognized that the wireless data system 400 typically supports many carrier base stations and many wireless devices.

The wireless device 410 includes a wireless phone 414 coded to channel 1, transceivers (transmitters and receivers) 416 coded to channels X, Y and Z, a wireless modem 418 that supports multiple channels, and a user system for 420. The wireless device 410 is built around a wireless phone device. However, it should be recognized that the wireless device 410 could be other mobile computing devices besides those providing voice call capability. In fact, what is important with respect to the invention is that the mobile computing devices have data transmission and/or reception capability.

In any case, a conventional wireless phone would include a transmitter and a receiver coded to a particular channel, provide a modem for a particular channel, and provide a user system. However, the wireless device 410 additionally operates such that it is able to transmit and receive data over not only the particular channel but also additional channels through use of the transceivers 416 and the wireless modem 418.

The wireless device 412 is similar to the wireless phone 410. The wireless device 412, however, additionally supports not only the particular channel (channel N) but also supports capability of using additional channels (namely, channels P, S, X). In particular, the wireless device 412 includes a wireless phone 422 coded to channel N, transceivers (transmitters and receivers) 424 coded to channels P, S, X, a wireless modem 426 that supports multiple channels, and a user system 428.

Accordingly, multiple channels can be utilized between a single wireless device and the wireless network 404 so that wireless access to a public network 430 can be provided by the wireless ISP 402. As a result, the data transfer capability between the carrier base stations 406 and 408 and the wireless devices 410 and 412 can be adjusted in accordance with user's needs or desires.

The public network 430 is, for example, the World Wide Web or the Internet. The public network 430 couples to the content servers 432 and 434, a data center 436, and Internet Service Providers (ISPs) 438 and 440. The ISP 438 supports users 442 and 444, and the ISP 440 supports user's 446 and 448.

Figure 5:
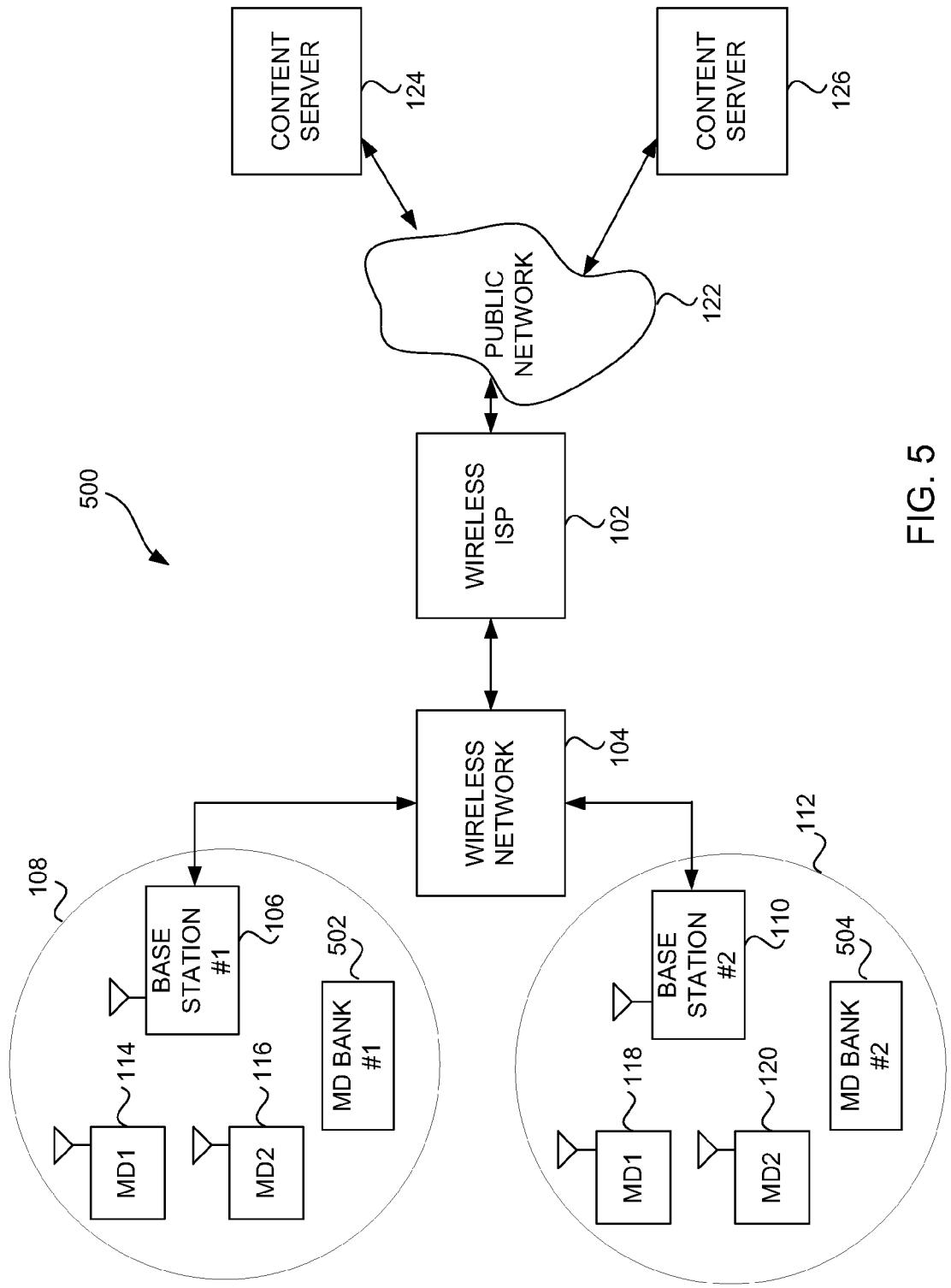
FIG. 5 is a block diagram of a wireless data system according to another embodiment of the invention.

FIG. 5 is a block diagram of a wireless data system 500 according to another embodiment of the invention. The wireless data system 500 illustrated in FIG. 5 is generally similar to the wireless data system 100 illustrated in FIG. 1. However, in this embodiment, the wireless data system 500 further includes a mobile device bank number #1 502 in the first geographic area 108, and a mobile device bank number #2 504 in the second geographic area 112. The multiple mobile device banks 502 and 504 operate as dummy mobile devices present within a geographic area supported by a particular base station associated with the wireless network 104. Each mobile device bank 502 and 504 supports a plurality of channels over which data can be transmitted. Since these channels are not associated with mobile devices being utilized by users, such as mobile devices 114 and 116 within the geographic region 108, these channels provided by the mobile device banks 502 and 504 are referred to as additional channels.

In one implementation, these additional channels provided by the mobile device banks 502 and 504 are utilized as multicast channels. For example, when several mobile devices within a geographic region desire the same content to be downloaded or transmitted to such mobile devices, a multicast data transmission format can be utilized. Here, at least one of the additional channels provided by the mobile device bank within the geographic region of the requesting mobile devices would be allocated for the multicast data transmission. Then, the wireless network 104 and the appropriate base station would transmit the requested content in a multicast manner to both requesting mobile devices using the allocated additional channel. Additionally, the mobile devices that desire to receive the multicast data and that are within the geographic region supported by the base station would have their additional receiver circuitry tuned to the allocated additional channel. Consequently, several mobile devices are able to simultaneously receive the transmission of the multicast data over the allocated additional channel.

Figure 6:
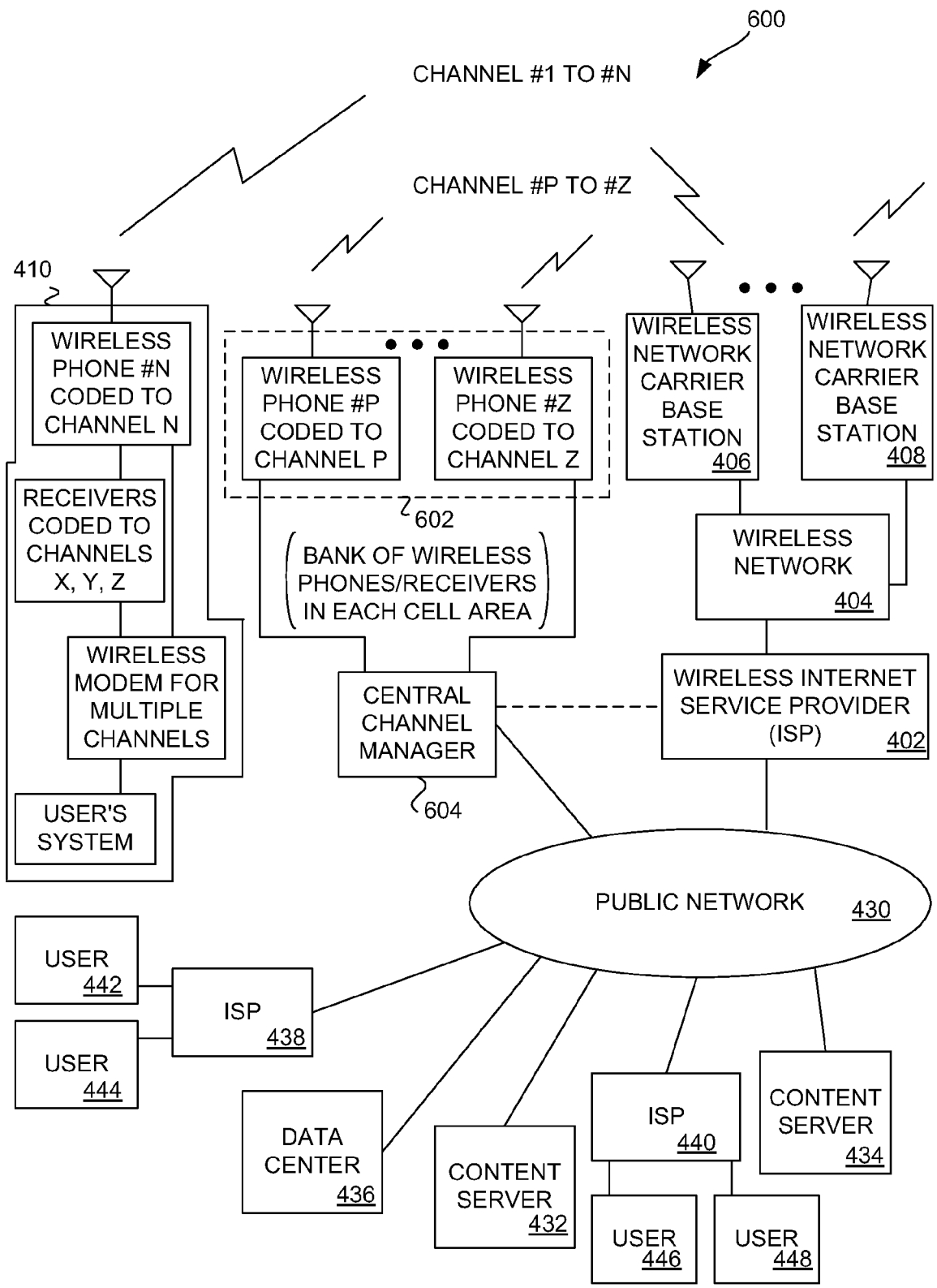
FIG. 6 is a block diagram of a wireless data system according to another embodiment of the invention.

FIG. 6 is a block diagram of a wireless data system 600 according to another embodiment of the invention. The wireless data system 600 is generally similar to the wireless data system 400 illustrated in FIG. 4. However, like FIG. 5, the wireless data system 600 supports multicast data transmissions. Hence, the wireless data system 600 includes, within each base station region (or geographic area) a bank 602 of wireless devices (e.g., wireless phones). For example, as shown in FIG. 6, the bank 602 of wireless devices can include wireless phones for each of channels P, Q, R, . . . , Z. This represents eleven additional channels that can be utilized for transmitting multicast formatted data to the various wireless devices within the geographic area (e.g., cell area) supported by a particular carrier base station. The additional channels can be shared between different geographic areas (e.g., cell areas). Thus, the channels available within a particular geographic area can vary and can be controlled. A central channel manager 604 can be provided and coupled (wired or wireless) to each of the banks of wireless devices in the various geographic regions. The channel manager 604 can then control the banks to program particular channels to be provided in particular geographic area. For example, the channel manager 604 can assign additional channels to those geographic areas having greater need for multicast data transmissions then other regions. Hence, the central channel manager 604 is able to dynamically control those the banks of wireless devices so that the number of additional channels available in a particular geographical region can be altered as its needs and needs of other geographical regions change. When the central channel manager provides dynamic control, the additional channels are able to be used with improved efficiency.

The central channel manager 604 couples to the banks of wireless device and can be within or controlled by the wireless ISP 402. The central channel manager 604 could be embedded within the wireless ISP 402 or could communicate with the wireless ISP 402 by a dedicated link or through a network connection. Alternatively, the central channel manager 604 can be controlled by another party.

Figure 7:
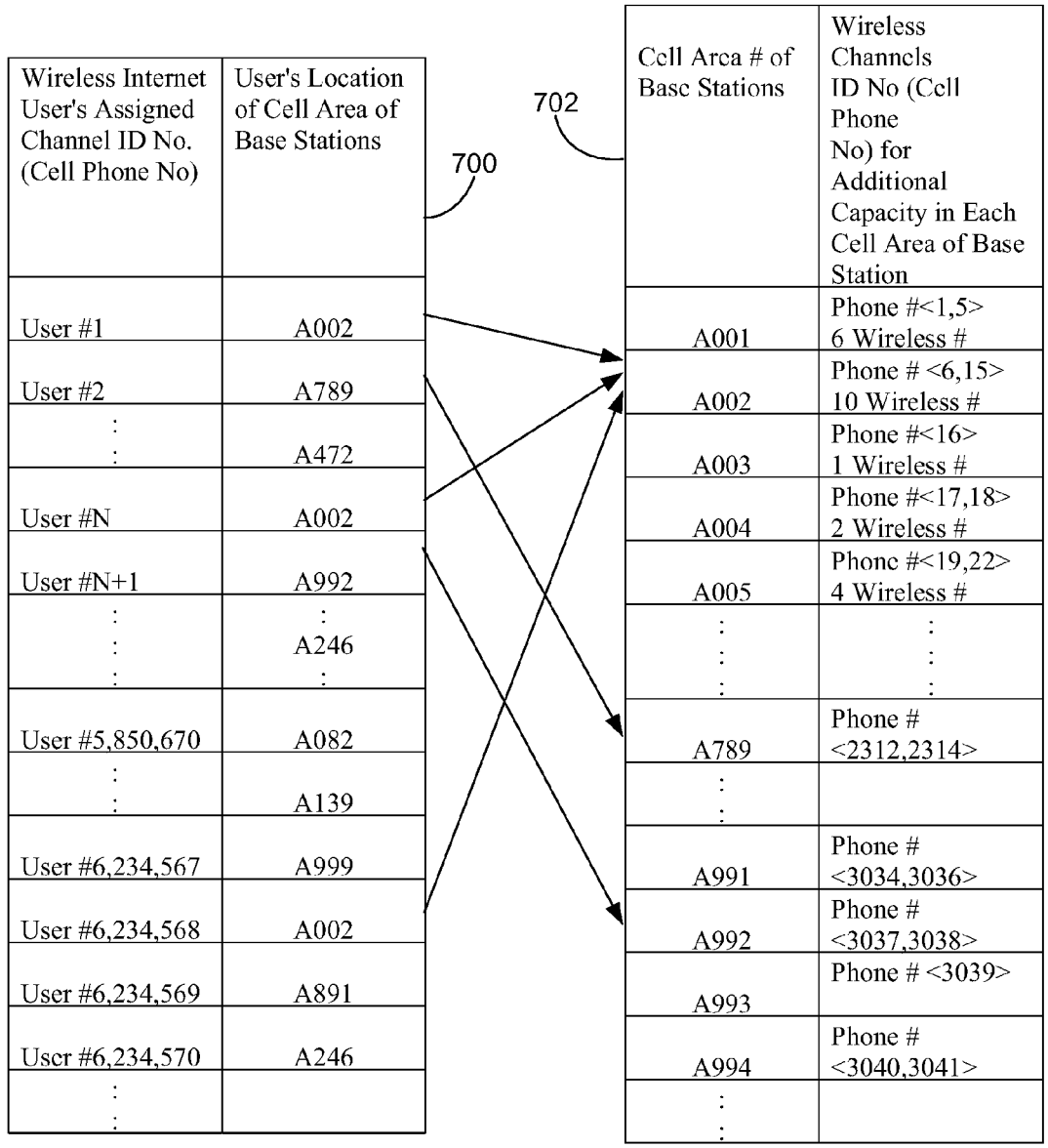
FIG. 7 illustrates a location table indicating locations of mobile devices, and an additional channel assignments table indicating representative assignments of additional channels to particular base stations.
Figure 8:
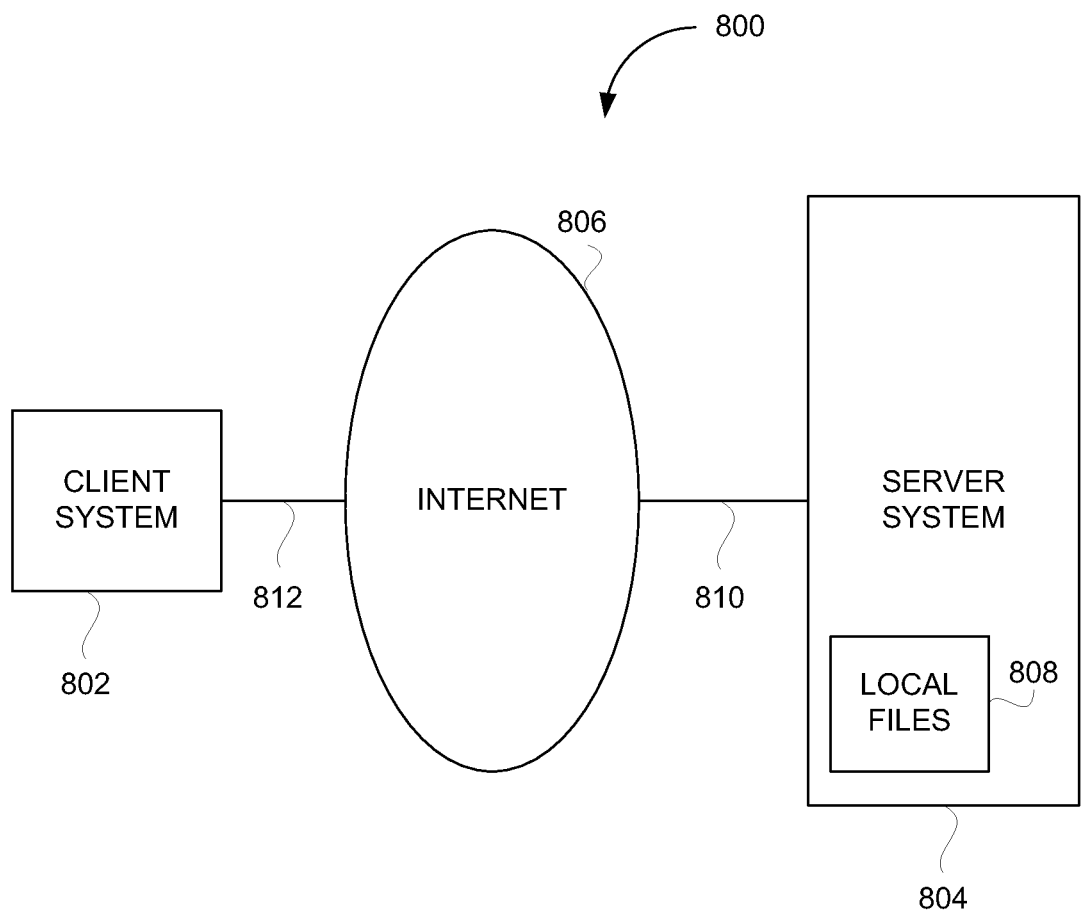
FIG. 8 is a conventional client/server system.

FIG. 7 illustrates a location table 700 indicating locations of mobile devices, and an additional channel assignments table 702 indicating representative assignments of additional channels to particular base stations. The first column of the table 700 indicates assigned channel identifier numbers (e.g., cell phone numbers; SINs, or EINs) for mobile devices (wireless Internet users). The second column of the table 700 indicates user's location in terms of a cell area of base stations. The first column of the table 702 indicates cell areas of base stations, and the second column of the table 702 indicates assigned wireless channels (additional channels) for an associated cell area.

In one embodiment, the assigned wireless channels (e.g., number of wireless channels and the channel number therefor) in the table 702 can be dynamically updated or changed through remote control by the wireless ISP by loading the ID codes for the assigned wireless channels into the banks (e.g., bank 602) of wireless cell phones in the cell area of the base stations desired. By calling or sending data to the cell phone numbers of the centrally managed bank of wireless phones, the appropriate base station in the area designated will send out the RF signals for the mobile device in the area to receive. Depending on the criteria established, the wireless ISP will load one or more ID codes to the user's wireless cell phone through user's own cell phone ID channel which also serves as a control channel. Therefore, the user's wireless cell phone is tuned and/or time multiplexed decoded to the same data channels transmitted by the base station in user's geographic cell area. The user's geographic cell area of a base station can be identified by a Global Positioning System (GPS) or data provided by the wireless network carrier.

Still further another aspect of the invention is that when requesting a web page using a mobile device through use of a wireless ISP, one or more additional channels can be used to transfer portions of the web page to the requesting mobile device. For example, a web page might have a graphic image that provides an advertisement portion for the web page. Often such graphic images are fetched by the web page itself. When multiple mobile devices within a geographical region are fetching the same advertisement portion, then an additional channel from a bank of additional channels could be used to multicast the data for the advertisement portion to the multiple mobile devices.

By providing advertisement images over a separate additional channel, the wireless ISP is able to provide the advertisement to mobile devices without requiring users of the mobile devices to incur connection charges for receiving advertisements. More generally, the invention facilitates use of separate channels for different portions of a web page or other resource. In this manner, certain channels can carry free content while other channels incur a fee for their use.

The invention operates independent of the particular technology underlying the wireless network. The wireless Internet access is able to be provided using existing wireless networks. The additional channels can be assigned and utilized under the control of the wireless ISP, and not dependent on the wireless network. Hence, the wireless ISP can be an enterprise separate and independent from the wireless network carriers.

Wireless carriers typically perform dynamic channel allocation to better utilized their available frequency spectrum. It should also be understood that the dedicated, normal, fixed or private channel for a wireless device referred to above is designated at a particular time by the wireless carriers through use of a cell phone number or System Identification Number (SIN). The wireless carriers control assignment of a cell phone number or SIN to a particular wireless device at the time the wireless service is subscribed. Thus, the dedicated, normal, fixed or private channel referred to above is technically dedicated or private to a mobile device only during the particular time that the wireless carrier has made them such (e.g., during a timeslice). With the invention, cell phone numbers, SINs, or other identifiers can be changed or allocated to different wireless devices. This ability to change or allocate cell phone numbers, SINs or other identifiers thus enables more efficient use of the additional channels discussed above.

The invention can be implemented in software, hardware, or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that available wireless bandwidth can be more efficiently utilized. Another advantage of the invention is that improved data transfers through a wireless data network are achieved through use of additional channels that can be allocated. Still another advantage of the invention is that a large number of users (subscribers) can be supported with less wireless bandwidth. Yet still another advantage of the invention is that the dynamic wireless bandwidth allocation for wireless Internet unicast, multicast or broadcast can be achieved without the business and operational interference and control from the wireless network carriers. Another advantage of the invention is that it can be implemented independent of the different hardware and software standards generally employed by many different wireless carriers.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A system for transmitting data from servers through a wireless data network to wireless clients, each of the wireless clients having an assigned wireless data channel allocated thereto, said system comprising:
   a wireless Internet Service Provider center coupled to the wireless data network and a wired data network, the wireless data network utilizing a plurality of base stations located at geographically distinct areas; and
   a plurality of banks of additional wireless devices, each of the additional wireless devices being capable of providing at least one additional wireless data channel to wireless Internet Service Provider via the wireless data network, wherein, when one or more of the wireless clients have a need for greater wireless bandwidth, one or more of the additional wireless data channels from one or more of the additional wireless devices in one or more of the banks are able to be temporarily allocated to the one or more of the wireless clients, wherein the wireless clients comprise programmable receivers, and wherein the programmable receivers are able to be programmed to one or more of the additional wireless data channels, wherein said system further comprises:
  a channel manager operatively connected to one or more of banks of additional wireless devices to control allocation of the additional wireless data channels associated with the one or more of banks,
  wherein channel manager communicates with at least one of banks to allocate at least one of the additional wireless data channels for processing a particular data transfer to at least one of the wireless clients, and
  wherein said system further operates to inform the at least one of the wireless clients of the at least one of the additional wireless data channels being allocated.

2. A system as recited in claim 1, wherein each of banks are located in a different one of the geographically distinct areas.

3. A system as recited in claim 1, wherein the wired data network includes at least a portion of a global computer network.

4. A system as recited in claim 1, wherein said system sends one or more channel identifiers to the at least one of the wireless clients, the one or more channel identifiers uniquely identify the at least one of the additional wireless data channels being allocated.

5. A system as recited in claim 4, wherein the at least one of the wireless clients receiving the one or more channel identifiers operates to configure the corresponding programmable receiver of the at least one of the wireless clients in accordance with the one or more channel identifiers.

6. A system as recited in claim 4, wherein data is transmitted from at least one of the servers to the at least one of the wireless clients using the at least one of the additional wireless data channels.

7. A system as recited in claim 6, wherein said system sends the data at least in part using multicast transmissions.

8. A system as recited in claim 6, wherein the data being transmitted over the at least one of the additional wireless data channels from at least one of the servers to the at least one of the wireless clients includes only a portion of a webpage.

9. A system as recited in claim 8, wherein the portion of the webpage is an advertisement.

10. A system as recited in claim 4, wherein said system sends channel deallocation information to the at least one of the wireless clients.

11. A system as recited in claim 10, wherein in response to the channel deallocation information, the corresponding programmable receiver of the at least one of the wireless clients is programmed to discontinue its use of the one or more additional wireless data channels previously being allocated.

12. A system as recited in claim 1, wherein each of the one or more additional wireless data channels are used to transmit a different portion of a resource to the one or more of the wireless clients.

13. A system as recited in claim 12, wherein the resource is a webpage.

14. A system as recited in claim 1, wherein data is transmitted from at least one of the servers to the at least one of the wireless clients using the at least one of the additional wireless data channels.

15. A system as recited in claim 14, wherein said system sends the data at least in part using multicast transmissions.

16. A system as recited in claim 1, wherein said system sends channel deallocation information to the at least one of the wireless clients.

17. A system as recited in claim 16, wherein in response to the channel deallocation information, the corresponding programmable receiver of the at least one of the wireless clients is programmed to discontinue its use of the one or more additional wireless data channels previously being allocated.

18. A system as recited in claim 1, wherein the channel manager accesses a table that associates channel identification numbers with the wireless clients.

19. A system as recited in claim 1, wherein the channel manager accesses a table that associates channel identification numbers with the wireless clients within a given cell area of the corresponding base station.

20. A system as recited in claim 1,
  wherein each of the one or more additional wireless data channels are used to transmits a different portion of a resource to the one or more of the wireless clients,
  wherein data for a first part of a resource is transmitted from at least one of the servers to the at least one of the wireless clients using a first of the at least one of the additional wireless data channels,
  wherein data for a second part of the resource is transmitted from at least one of the servers to the at least one of the wireless clients using a second of the at least one of the additional wireless data channels, and
  wherein after the resource has been transmitted, said system sends channel deallocation information to the at least one of the wireless clients to deactivate its temporary allocation of its use of the first and second of the at least one of the additional wireless data channels.

* * * * *